US012174876B2

(12) United States Patent
Shaked et al.

(10) Patent No.: US 12,174,876 B2
(45) Date of Patent: Dec. 24, 2024

(54) METHOD FOR IDENTIFYING A SEMATIC TYPE OF DATA CONTAINED IN A COLUMN OF A TABLE

(71) Applicant: Oracle International Corporation, Redwood Shores, CA (US)

(72) Inventors: Guy Shaked, Be'er Sheva (IL); Dima Alberg, Arad (IL); David Greenfield, Woodstock (GB)

(73) Assignee: Oracle International Corporation, Redwood Shores, CA (US)

( * ) Notice: Subject to any disclaimer, the term of this patent is extended or adjusted under 35 U.S.C. 154(b) by 30 days.

(21) Appl. No.: 17/899,799

(22) Filed: Aug. 31, 2022

(65) Prior Publication Data
US 2024/0070184 A1 Feb. 29, 2024

(51) Int. Cl.
*G06F 16/00* (2019.01)
*G06F 16/35* (2019.01)

(52) U.S. Cl.
CPC .................................. *G06F 16/355* (2019.01)

(58) Field of Classification Search
CPC ......... G06F 16/355; G06F 21/32; G06F 18/22
See application file for complete search history.

(56) References Cited

U.S. PATENT DOCUMENTS

| | | | | |
|---|---|---|---|---|
| 7,426,520 | B2 * | 9/2008 | Gorelik | G06F 16/2237 707/999.102 |
| 9,336,192 | B1 * | 5/2016 | Barba | G06F 40/284 |
| 2008/0243832 | A1 * | 10/2008 | Adams | G06F 16/334 707/999.005 |
| 2012/0101975 | A1 * | 4/2012 | Khosravy | G06Q 30/02 706/55 |
| 2021/0365443 | A1 * | 11/2021 | Mostafa | G06F 16/243 |
| 2021/0406452 | A1 * | 12/2021 | Hasan | G06N 3/045 |
| 2022/0198581 | A1 * | 6/2022 | Rusu | G06F 40/284 |

* cited by examiner

*Primary Examiner* — Leslie Wong
(74) *Attorney, Agent, or Firm* — Hickman Becker Bingham Ledesma LLP

(57) ABSTRACT

Techniques are provided for determining the semantic-type of a target column based on "fingerprints" that are created based on the values in the target column. The fingerprint set for the target column is only generated once, not once per semantic-type. Thus, the target column only needs to be scanned once, and resource usage is minimized. Once generated, the fingerprint set of the column is compared against fingerprint set that corresponds to each semantic-type to generate a "similarity measure". The semantic-type whose fingerprint set produces the highest similarity measure relative to the target column's fingerprint set is determined to be the semantic-type of the target column.

22 Claims, 9 Drawing Sheets

| COLUMN 100 | EU | EU | YZ | SA |
|---|---|---|---|---|

FIG. 1

| COLUMN 200 | EU | AF | AS | AN | OC | NA | SA |

FIG. 2

COLUMN 300

| Asia |
| Australia |
| Antarctica |
| Europe |
| North America |
| South America |
| Africa |

FIG. 3

| Measure | | Formula |
|---|---|---|
| D[i] | | If query char presents in lookup chars then 1 else 0. |
| N[i] | | Query row i length |
| R[i] | | Lookup row i length |
| Precision | P | sum(D[i]) / N[i] |
| Recall | R | sum(D[i]) / R[i] |
| FMeasure[beta] | F[b] | F[b] = (1+b^2)*(P*R)/(b^2*P + R)<br><br>where:<br><br>b > 0<br><br>...<br><br>If b = 0 then F(0) = P |

FIG. 4

QUERY FOR LCD

```
SELECT  r,
        str
FROM    (SELECT r,
                Listagg(ch) str
         FROM   (WITH st
                 AS (SELECT column1,
                            Count(*) cs
                     FROM   continent
                     GROUP  BY column1),
                 x
                 AS (SELECT ROWNUM r
                     FROM   dual
                     CONNECT BY ROWNUM < 25)
                 SELECT x.r,
                        Substr(column1, x.r, 1) ch,
                        SUM(cs)                 cs
                 FROM   st,
                        x
                 GROUP  BY x.r,
                        Substr(column1, x.r, 1)
                 ORDER  BY 1,
                        2)
         GROUP  BY r)
WHERE   str IS NOT NULL;
```

FIG. 5

QUERY FOR RCD

```
SELECT  r,
        str
FROM    (SELECT r,
                Listagg(ch) str
         FROM   (WITH st
                 AS (SELECT Reverse(To_char(column1)) column1,
                            Count(*)                         cs
                     FROM   continent
                     GROUP  BY column1),
                 x
                 AS (SELECT ROWNUM r
                     FROM   dual
                     CONNECT BY ROWNUM < 25)
                 SELECT x.r,
                        Substr(column1, x.r, 1) ch,
                        SUM(cs)                 cs
                 FROM   st,
                        x
                 GROUP  BY x.r,
                           Substr(column1, x.r, 1)
                 ORDER  BY 1,
                           2)
         GROUP  BY r)
WHERE   str IS NOT NULL;
```

FIG. 6

QUERY FOR GCD

```
SELECT  Listagg(ch, '')
            within GROUP (ORDER BY ch)
FROM    (WITH st
            AS (SELECT column1
                FROM   continent
                GROUP  BY column1),
            x
            AS (SELECT ROWNUM r
                FROM   dual
                CONNECT BY ROWNUM < 25)
        SELECT Substr(column1, x.r, 1) ch
        FROM   st,
               x
        GROUP  BY Substr(column1, x.r, 1)
        ORDER  BY 1);
```

FIG. 7

QUERY FOR LCD, RCD, AND GCD

FIG. 8

METHOD FOR IDENTIFYING A SEMATIC TYPE OF DATA CONTAINED IN A COLUMN OF A TABLE

FIELD OF THE INVENTION

The present invention relates to techniques for identifying a semantic-type of data in a column of a table.

BACKGROUND

It is relatively straightforward to identify the datatype of data in a column of a table. For example, in a conventional database, a data dictionary stores information about the tables that exist in the database, including the datatype of each of the columns of each of the tables. Thus, by inspecting a data dictionary, one may determine whether a column X of table T stores strings, integers, dates, etc.

However, it is often important to know more about the information in the column, such as what the values in the column actually represent. What the values in a column represent is referred to herein as the "semantic-type" of the column. For any given datatype, there is a near-limitless number of possible semantic-types. For example, a column that contains integers may be used to store ages, number of sales, inventory counts, etc. Similarly, a column that contains strings may be used to store first names, last names, city names, country names, continent names, store names, product names, etc.

Identifying the semantic-type of a column is much more difficult than identifying the data type of a column. However, for efficient autonomous management of a database, accurately identifying the semantic-type of columns may be important. For example, if a column contains geography information, it should be treated one way during autonomous management. On the other hand, if the column contains customer information, it should be treated differently than geography information.

Current efforts to identify the semantic-type of a column often involve the use of regular expressions. For example, one or more regular expressions may be created for each possible semantic-type. The data in a column may then be scanned to determine how many values in the column satisfy the regular expression(s) for a given semantic-type. This process may be repeated for each semantic-type. Once completed, the semantic-type whose regular expression(s) resulted in the most matches may be considered to be the semantic-type of the column.

Look-up tables may be used in a manner similar to regular expressions. For example, each possible semantic-type may have a look-up table that is populated with common values of that semantic-type. For example, the look-up table for the semantic-type "continents" may be populated with "Europe", "Asia", "Africa", "North America", "South America", "Australia" and "Antarctica". To determine whether a particular target column has a particular semantic-type, the target column may be scanned to determine how many of the values in the target column match values in the look-up table for the semantic-type. This process may be repeated for each semantic-type. Once completed, the semantic-type whose look-up table resulted in the most matches may be considered to be the semantic-type of the column. In some situations, the regular expression approach and the look-up table approach may be combined, where regular expressions are used for some semantic-types, and look-up tables are used for other semantic-types.

Unfortunately, whether the regular expression approach is used, the look-up table approach is used, or the approaches are combined, the process of determining the semantic-type of a column can be resource intensive. The resource (e.g. CPU) consumption may be reduced by running the tests only on a small sample of values from the column. However, the smaller the sample data set on which the tests are run, the lower the accuracy of the semantic-type determination.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 1 illustrates a target column that is used in examples given herein;

FIG. 2 illustrates a fixed-length column for the semantic-type "continent-abbreviations";

FIG. 3 illustrates a variable-length column for the semantic-type "continent";

FIG. 4 illustrates a formula for generating a similarity measure, according to an implementation;

FIG. 5 illustrates a SQL query for generating LCD fingerprints, according to an implementation;

FIG. 6 illustrates a SQL query for generating RCD fingerprints, according to an implementation;

FIG. 7 illustrates a SQL query for generating GCD fingerprints, according to an implementation;

FIG. 8 illustrates a SQL query for generating LCD, RCD and GCD fingerprints in a single pass over a column.

DETAILED DESCRIPTION

Figure 9:
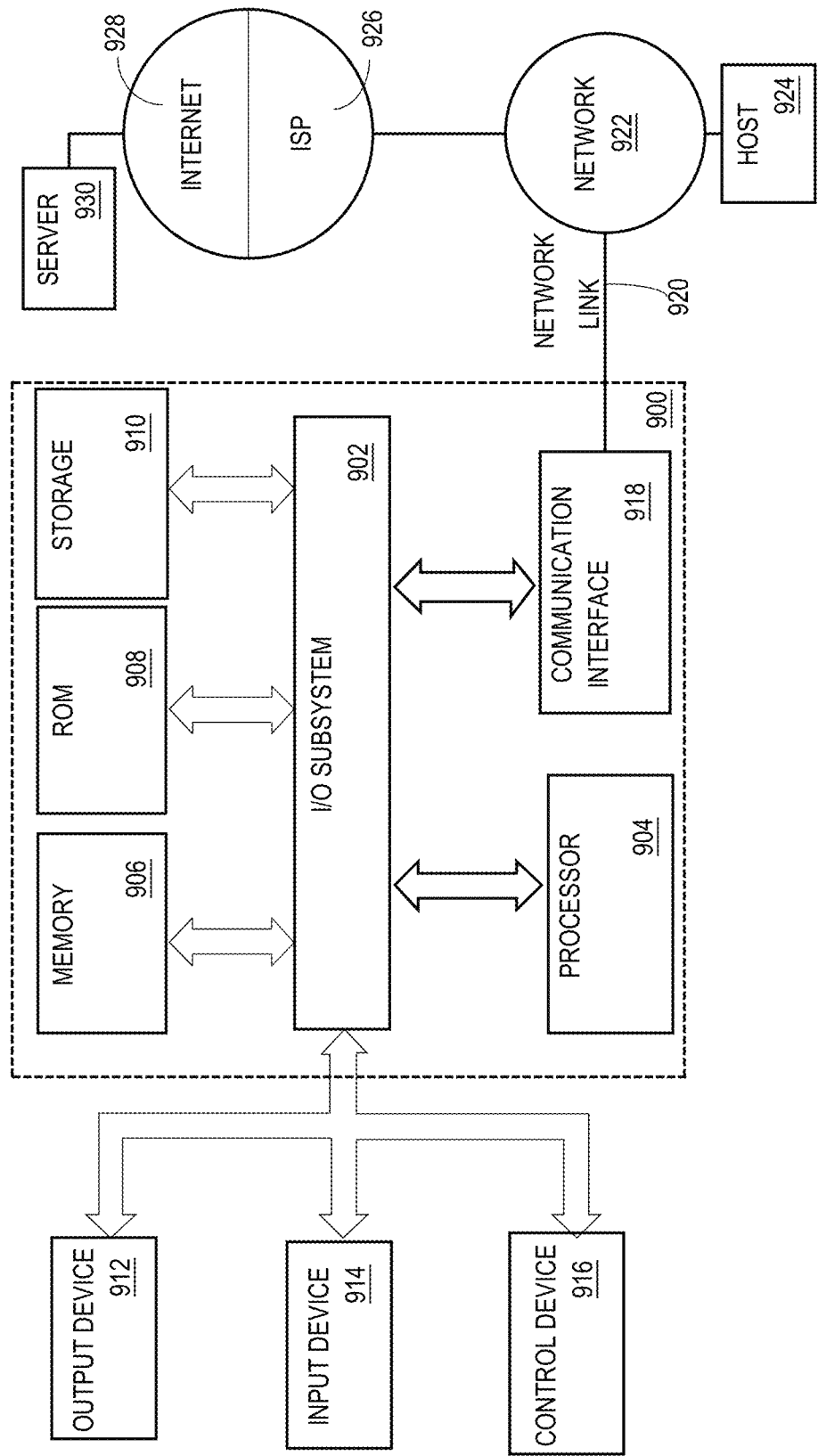
FIG. 9 a computer system upon which the techniques described herein may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.
General Overview Techniques are provided for determining the semantic-type of a target column based on "fingerprints" that are created based on the values in the target column. The fingerprint set for the target column is only generated once, not once per semantic-type. Thus, the target column only needs to be scanned once, and resource usage is minimized. Once generated, the fingerprint set of the column is compared against fingerprint set that corresponds to each semantic-type to generate a "similarity measure". The semantic-type whose fingerprint set produces the highest similarity measure relative to the target column's fingerprint set is determined to be the semantic-type of the target column.

According to one implementation, multiple fingerprint-generation techniques may be used. If using a first fingerprint-generation technique does not produce a similarity measure that is above a given threshold, then a second fingerprint-generation technique may be used. This process may continue until either (a) a fingerprint-generation technique produces at least one similarity measure that is above the given threshold, or (b) all fingerprint-generation techniques have been used. If all fingerprint-generation techniques have been used and none has produced a similarity measure above the threshold, then the system may determine that the column's semantic-type is unknown.

In other implementations, the results of the multiple fingerprint-generation techniques may be combined to determine the semantic-type of a column. For example, assume that three fingerprint-generation techniques are used, and that the column is being tested for three possible semantic-types X, Y and Z. If the fingerprint set of semantic-type X produces the highest similarity measure for one of the fingerprint-generation techniques, and the fingerprint set of semantic-type Y produces the highest similarity measure for two of the fingerprint-generation techniques, then the column may be determined to be semantic-type Y. In yet another implementation, the similarity measures for each fingerprint-generation technique for a given semantic-type may be combined to produce a combined similarity measure. The semantic-type with the highest combined similarity measure may be determined to be the semantic-type of the column.

Fingerprint-Generation Techniques

As mentioned above, the techniques described herein involve generating a fingerprint set (comprising one or more fingerprints) based on values in a column, and comparing that target column fingerprint set to the fingerprint set (comprising one or more fingerprints) associated with each of various semantic-types to determine the semantic-type of the column. The semantic-type determination approach described herein is not limited to any particular fingerprint-generation technique. For example, the semantic-type determination may be performed using per-column fingerprint generation techniques, per-position fingerprint-generation techniques, or any combination thereof.

Per-Column Fingerprint-Generation Techniques

A per-column fingerprint-generation technique is a fingerprint-generation technique that produces a single fingerprint for an entire column. This single fingerprint may be compared to a single fingerprint for each of the semantic-types, created suing the same fingerprint-generation technique) to determine the similarity measures. The similarity measures, in turn, may be used to determine the semantic-type of the column.

Figure 1:
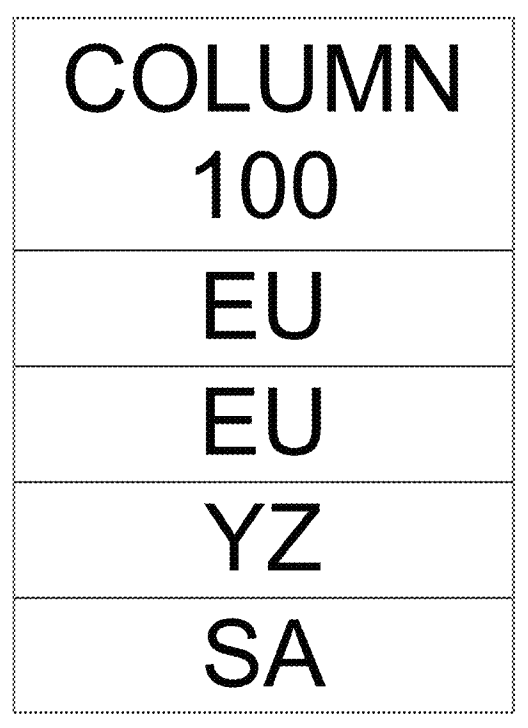

Referring to FIG. 1, it illustrates a column 100 that stores values of the data type "string". While the database system that manages the table that includes column 100 knows from the table definition that column 100 stores strings, the database system does not initially know the semantic-type of column 100.

A simple per-column fingerprint generation technique involves extracting all characters from all strings in the column, sorting the characters, and then eliminating duplicates. This fingerprint-generation technique shall be referred to herein as the "GCD" technique. Applying the GCD technique to the contents of column 100 produces the string "aesuyz".

Figure 2:
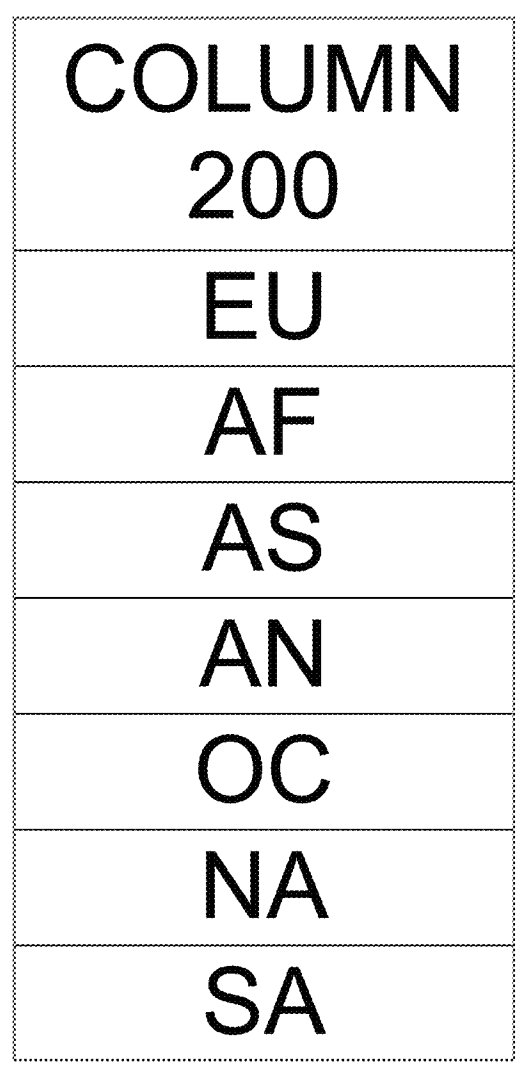

The GCD fingerprint for the semantic-type "continent-abbreviations" may be generated in a similar manner. For example, FIG. 2 illustrates a column 200 that includes two-letter abbreviations for each of the continents. Applying the GCD technique to the strings of column 200 produces the string "acefnosu".

Once the GCD fingerprints have been generated for both column 100 and the semantic-type "continent-abbreviations", the two strings may be compared to determine a similarity measure that reflects the likelihood that column 100 has the semantic-type of "continent-abbreviations". How the similarity measured are generated shall be described in greater detail hereafter.

Per-Position Fingerprint-Generation Techniques

In contrast to per-column fingerprint-generation techniques, per-position fingerprint-generation techniques produce one fingerprint per character position within the column. Because per-position fingerprint-generation techniques produce one fingerprint per character position, the number of fingerprints in the fingerprint set produced by such techniques is dictated by the longest value contained in the column. In the present example, all of the values in column 100 have only two characters, so applying a per-position fingerprint-generation technique to column 100 will produce a fingerprint set containing two fingerprints.

A simple example of a per-position fingerprint-generation technique is the "LCD" technique in which a fingerprint is made for each character position by creating a string from all characters at that position, sorted, with duplicates eliminated. For example, the leftmost character position of column 100 includes the characters "E", "E", "Y" and "S". Thus, the LCD fingerprint for the leftmost character position in column 100 would be "esy". Similarly, the LCD fingerprint for the second-from-the-left character position in column 100 would be "auz", based on the second-from-the-left position characters of "U", "U", "Z" and "A".

The LCD fingerprint set for the "continent-abbreviations" semantic-type may be created by applying the same technique to the values in column 200. Doing so produces "aenos" for the leftmost character position, and "acfnsu" for the second-from-the-left character position.

The LCD similarity measure for column 100 for the "continent-abbreviations" semantic-type may therefore be generated by:

comparing the leftmost LCD fingerprint of column 100 (i.e. "esy") to the leftmost LCD fingerprint of the "continent-abbreviations" semantic-type (i.e. "aenos"), and comparing the second-from-the-left LCD fingerprint of column 100 (i.e. "auz") to the second-from-the-left LCD fingerprint of the "continent-abbreviations" semantic-type (i.e. "acfnsu").

The specifics of how the per-position similarity measures are generated, and how the per-position similarity measures are combined to create a combined similarity measure, shall be discussed in greater detail hereafter.

Another simple example of a per-position fingerprint-generation technique is the "RCD" technique. The "RCD" technique is similar to the "LCD" technique except that the "first" character position is the rightmost character position. Similarly, the second RCD character position is the second-from-rightmost character position. Consequently, the position-1 RCD fingerprint of column 100 is "auz", while the position-2 RCD fingerprint of column 100 is "esy".

As can be seen by the above example, for columns containing fixed-length values, the LCD and RCD fingerprint generation techniques produce the same fingerprints, but in the reverse order. However, for columns with variable-length values, the fingerprints produced by the RCD and LCD fingerprint-generation techniques may differ significantly. For example, consider the content of column 300, illustrated in FIG. 3. The LCD fingerprint set that would be created for the values in column 300 includes:

| TECHNIQUE | POSITION | FINGERPRINT |
| --- | --- | --- |
| LCD | 1 | aens |
| LCD | 2 | fnosu |
| LCD | 3 | irstu |
| LCD | 4 | aiot |
| LCD | 5 | chpr |
| LCD | 6 | ace |
| LCD | 7 | alt |
| LCD | 8 | im |
| LCD | 9 | ace |
| LCD | 10 | ar |
| LCD | 11 | i |
| LCD | 12 | c |
| LCD | 13 | a |

In contrast, the RCD fingerprint set that would be created for the values in column 300 includes:

| TECHNIQUE | POSITION | FINGERPRINT |
| --- | --- | --- |
| RCD | 1 | ae |
| RCD | 2 | icp |
| RCD | 3 | ilos |
| RCD | 4 | art |
| RCD | 5 | cefru |
| RCD | 6 | aemrt |
| RCD | 7 | as |
| RCD | 8 | u t |
| RCD | 9 | ahn |
| RCD | 10 | at |
| RCD | 11 | ru |
| RCD | 12 | o |
| RCD | 13 | ns |

Generating Similarity Measures

As mentioned above, after a fingerprint-generation technique has been used to generate target-column fingerprint set and a semantic-type fingerprint set, a similarity measure for the semantic-type may be generated based on a comparison between the target-column fingerprint set and the semantic-type fingerprint set. Various techniques may be used to generate such similarity measures, and the semantic-type identification approaches described herein are not limited to any given similarity measure generation technique.

By way of example and not of limitation, a similarity measure for a given target column/semantic-type combination may be generated using the formula illustrated in FIG. 4. As illustrated in FIG. 4, $D[\ ]$ is an array of binary values, where $D[i]$ is 1 if the character at position i in the target-column fingerprint matches any character in the semantic-type fingerprint, and 0 if the character at position I in the target-column fingerprint does not match any character in the semantic-type fingerprint.

$N[\ ]$ is an array of target-column fingerprint length values, where $N[i]$ is the length of the fingerprint that was generated for character position i of the target column. For per-column fingerprint-generation techniques, such as GCD, N is a single value that indicates the length of the single target-column fingerprint, rather than an array.

$R[\ ]$ is an array of semantic-type fingerprint length values, where $R[i]$ is the length of the fingerprint that was generated for character position i of the semantic-type. For per-column fingerprint-generation techniques, such as GCD, R is a single value that indicates the length of the semantic-type fingerprint, rather than an array.

P represents "precision", which equals $sum(D[i])$ divided by $N[i]$. R represents "recall", which is the $sum(D[i])$ divided by $R[i]$. Finally, the similarity measure is F[b] which equals $(1+b^2)*(P*R)/(b^2*P+R)$, where $b>0$. If $b=0$, then $F[0]=P$.

Matching and Non-Matching Characters

When determining how closely two fingerprints match, the number of non-matching characters may be as significant as the number of matching characters. For example, assume that 10 characters match between a first fingerprint and a second fingerprint. Those 10 matching characters would indicate a very strong match if the two fingerprints being compared are 10 each characters long. However, if the either of the fingerprints is 20 characters long, then the match is weaker. If both fingerprints are 40 characters long, for example, than 10 matching characters represents a very weak match.

As another example, assume the target column fingerprint is "abx". Further assume that a first semantic-type fingerprint has "abcdefghijklmnopqrstuvwxyz" and second semantic-type fingerprint has "abxy". In this, case both semantic-type fingerprints will have all the characters of the target column fingerprint, but most likely that the second semantic-type fingerprint (4 chars) is a better match, since the first semantic-type fingerprint (26 chars) will match all text only target columns while the second semantic-type fingerprint (4 chars) will match significantly fewer fingerprints.

Based on the foregoing, whatever formula is used to calculate the closeness of fingerprints should account for both matching and non-matching characters. In the example formulas discussed herein, "Precision" is smaller if the character position fingerprint has many non-matching characters (because $D[\ ]$ is divided by $N[\ ]$). Similarly, "Recall" is smaller if the semantic-type fingerprint has many non-matching characters (because $D[\ ]$ is divided by $R[\ ]$). It should be noted that these specific formulas are merely exemplary, and the semantic determination techniques described herein are not limited to any specific formulas.

Example Application of the Similarity Measure Formula to GCD

As explained above, GCD is a per-column fingerprint-generation technique. Consequently, the target-column fingerprint set for GCD consists of a single target-column fingerprint, and the semantic-type fingerprint set for GCD for any given semantic-type consists of a single semantic-type fingerprint.

In the example given above, the GCD fingerprint for the contents of column 100 is "aesuyz". The GCD fingerprint for the "continent-abbreviations" semantic-type (generated from column 200) is "acefnosu". There are four characters in the target column fingerprint "aesuyz" that match characters in the semantic-type fingerprint "acefnosu". Four of the eight characters in the semantic-type fingerprint "acefnosu" are not matched by any characters in the target column fingerprint "aesuyz". Consequently, the $sum(D[i])$ for the (column 100, "continent-abbreviations") combination is 4.

The length $N[\ ]$ of the target column fingerprint "aesuyz" is 6. The length $R[\ ]$ of the semantic-type fingerprint "acefnosu" is 8. Consequently:

Precision $(P)=sum(D[i])/N[\ ]=4/6=0.67$

Recall $(R)=sum(D[i])/R[\ ]=4/8=0.5$

Plugging these numbers into the similarity measure formula, where $b=0.05$, produces the similarity measure: $F[b=0.05]=(1+0.05^2)*(0.67*0.5)/((0.05^2)*0.67)+0.5)=0.67$ Thus, the GCD similarity measure generated based on the combination (column 100, "continent-abbreviations") is 0.67. This similarity measure represents that likelihood that the contents of column 100 correspond to the semantic-type "continent-abbreviations". The higher the similarity measure of a semantic-type, the more likely the contents of the target column are of that semantic-type.

Example Application of the Similarity Measure Formula to LCD

As explained above, LCD is a per-position fingerprint generation technique, so for any given target column, the set of fingerprints produced by LCD is equal to the number of character positions in the largest value in the target column. In the case of column 100, the largest value has two characters, so the LCD will produce two fingerprints for the target-column fingerprint set: a position-1 target-column fingerprint, and a position-2 target-column fingerprint.

Similarly, because the largest value in the "continent-abbreviations" column 200 has two characters, the LCD will produce two fingerprints for the "continent-abbreviations" semantic-type fingerprint set: a position-1 semantic-type fingerprint, and a position-2 semantic-type fingerprint.

Position-1

Specifically, for position-1 (the leftmost position) in column 100, the LCD produces the fingerprint "esy". For position-1 (the leftmost position) in the "continent-abbreviations" column 200, the LCD produces the fingerprint "neaso". There are 2 characters in the position-1 target-column fingerprint "esy" that match characters in the position-1 semantic-fingerprint "neaso". Consequently, $N[1]=2$. The length $N[1]$ of position-1 target-column fingerprint "esy" is 3. The length $R[1]$ of the position-1 semantic-type fingerprint "neaso" is 5 (three of which were not matched by any characters in the position-1 fingerprint).

Position-2

For position-2 (the second-from-leftmost position) in column 100, the LCD produces the fingerprint "auz". For position-2 (the second-from-leftmost position) in the "continent-abbreviations" column 200, the LCD produces the fingerprint "acfnsu". There are 2 characters in the position-2 target-column fingerprint "auz" that match characters in the position-2 semantic-fingerprint "acfnsu". Consequently, $N[2]=2$. The length $N[2]$ of position-2 target-column fingerprint "auz" is 3. The length $R[1]$ of the position-2 semantic-type fingerprint "acfnsu" is 6 (four of which were not matched by any character in the position-2 fingerprint).

Combining Per-Position Values

Once the per-position values are determined, the values are combined prior to being applied to the distance formula, as illustrated in the following example:

$D[1]=2$, and $D[2]=2$, so $\text{sum}(D[i])=4$. (sum of matching characters for all character positions)

$N[1]=3$, and $N[2]=3$, so $\text{sum}(N[i])=6$. (sum of lengths of all fingerprints in target-column fingerprint set)

$R[1]=5$, and $R[2]=6$, so $\text{sum}(R[i])=11$ (sum of lengths of all fingerprints in "continent-abbreviations" semantic-type fingerprint set).

Consequently:

Precision $(P)=\text{sum}(D[i])/\text{sum}(N[i])=4/6=0.67$

Recall $(R)=\text{sum}(D[i]/\text{sum}(R[i])=4/11=0.36$

Plugging these numbers into the similarity measure formula, where $b=0.05$, produces the similarity measure: $F[b=0.05]=(1+0.05^2)*(0.67*0.36)/(0.05\ 2*0.67)+0.36)=0.67$ Similarity measures for all per-position fingerprint-generation techniques, including RCD, may be derived in a similar manner.

Using Multiple Fingerprint-Generation Techniques

A single fingerprint-generation technique may be used to produce fingerprints for a target column and any number of semantic-types. Those fingerprints may then be used to generate similarity measures between a target column and those semantic-types. For example, the GCD may be used to generate a fingerprint for a column X, and a fingerprint for each of 200 different semantic-types. By comparing the GCD fingerprint of column X to the GCD fingerprints of the 200 semantic-types, 200 similarity measures may be generated (one for each semantic-type). The semantic-type with the highest similarity measure may then be established as the semantic-type of column X.

The accuracy of similarity measures produced by any given fingerprint-generation technique will vary based on the nature of the data to which the fingerprint-generation technique is applied. Thus, given a particular column X, a first fingerprint-generation technique may produce similar similarity measurements for many semantic-types, making it difficult to select the correct semantic-type of column X. However, applying a second fingerprint-generation technique to the same column X and semantic-types may produce similarity measures that show a "clear winner" among the semantic-types.

Consequently, in some implementations, multiple fingerprint-generation techniques may be used to automatically determine the semantic-type of a column. The manner in which the similarity measures that are produced by the various fingerprint-generation techniques are used to determine the semantic-type of a column may differ from implementation to implementation. Various examples of how multiple fingerprint-generation techniques may be used shall be given hereafter. However, the semantic-type determination techniques described herein are not limited to any particular manner of using multiple fingerprint-generation techniques.

Serial Use of Multiple Fingerprint-Generation Techniques

In some implementations, the fingerprint-generation techniques may be used in a serial fashion, to avoid unnecessary resource consumption. For example, during a first phase, the GCD fingerprint-generation technique may be used to generate GDC fingerprints for the target column and each of the 200 semantic-types. For each of the 200 semantic-types, a similarity measure may then be generated based on GCD fingerprints. If the GCD similarity measures satisfy certain criteria, then the semantic-type with the highest GCD similarity measure is selected as the semantic-type of the target column. On the other hand, if the GCD similarity measures do not satisfy the criteria, then the process proceeds to a second phase.

During the second phase, a different fingerprint-generation technique may be used to generate fingerprints for the target column and each of the 200 semantic-types. For the purpose of discussion, it shall be assumed that the LCD fingerprint-generation technique is used during the second phase. Thus, during the second phase, for each of the 200 semantic-types, a similarity measure may be generated based on LCD fingerprints. If the LCD similarity measures satisfy certain criteria, then the semantic-type with the highest LCD similarity measure is selected as the semantic-type of the target column. On the other hand, if the LCD similarity measures do not satisfy the criteria, then the process proceeds to a third phase. This process may be repeated until a fingerprint-generation technique produces similarity measures that satisfy the criteria, or all fingerprint-generation techniques have been exhausted.

The criteria that must be satisfied by the similarity measures may be any criteria that indicate a "clear winner" among the semantic-types. For example, a criterion may be that the highest similarity measure is greater than a particular threshold (e.g. 0.8). As another example, a criterion may be that the highest similarity measure be significantly higher than all other similarity measures produced by the same fingerprint-generation technique. These are merely examples of criteria that may be used to establish a "stop condition" when iterating through multiple fingerprint-generation techniques. By ceasing the process as soon as a clear winner is found among the semantic-types, significant resources may be saved. For example, if the GCD similarity measures produce a clear winner, then the system avoids the need to execute the more resource-intensive per-position fingerprint-generation techniques, such as LCD and RCD.

Combined Similarity Measures

In some implementations, similarity measures for multiple fingerprint-generation techniques may be combined to produce a combined similarity measure. The combined similarity measures may be used to determine which semantic-type best matches the data that is in the target column. For example, after generating GCD, LCD and RCD similarity measures for each of 200 semantic-types, the three similarity measures may be combined to produce a single combined similarity measure for each semantic-type. The semantic-type with the highest combined similarity measure may then be selected as the semantic-type of the target column.

Similarity measures may be combined in a variety of ways, and the semantic-type determination approach described herein is not limited to any particular method of combining the similarity measures. For example, in a relatively simple embodiment, the GCD, LCD and RCD similarity measures for a given semantic-type may be summed to produce the combined similarity measure for the semantic-type. In more complex implementations, the similarity measures may be given different weights when generating the combined similarity measure. For example, LCD and RCD may be given more weight than GCD. In yet another implementation, similarity measures that are above a certain threshold may be given more weight in the generation of combined similarity measures than similarity measures that are below certain thresholds.

Combined similarity measures may be used in conjunction with serial use of fingerprint generation techniques. For example, in one implementation, during a first phase, GCD similarity measures may be generated. If the GCD similarity measures do not produce a "clear winner", then during the second phase both LCD and RCD similarity measures may be generated. The LCD and RCD similarity measures may be combined to produce a combined similarity measure that is used to select the semantic-type that best matches the target column.

Example Queries for Generating Fingerprints

One way to generate the fingerprints is to execute a database query against the column that contains the values for which the fingerprint is to be generated, where the query has logic for generating the fingerprint for a given fingerprint-generation technique. For example, FIG. 5 illustrates a SQL query for generating LCD fingerprints. The query illustrated in FIG. 5 can give the format information if all fields are of the same fixed sized format. In addition, the query can give the size of the field if it is fixed, and if it is not fixed it gives the average size and deviation.

FIG. 6, it illustrates a SQL query for generating RCD fingerprints. FIG. 7 illustrates a SQL query for generating GCD fingerprints based on the results produced by the LCD and RCD queries. Specifically, the query illustrated in FIG. 7 sums over location in the left or right justified query, and groups by the character.

Figure 8:
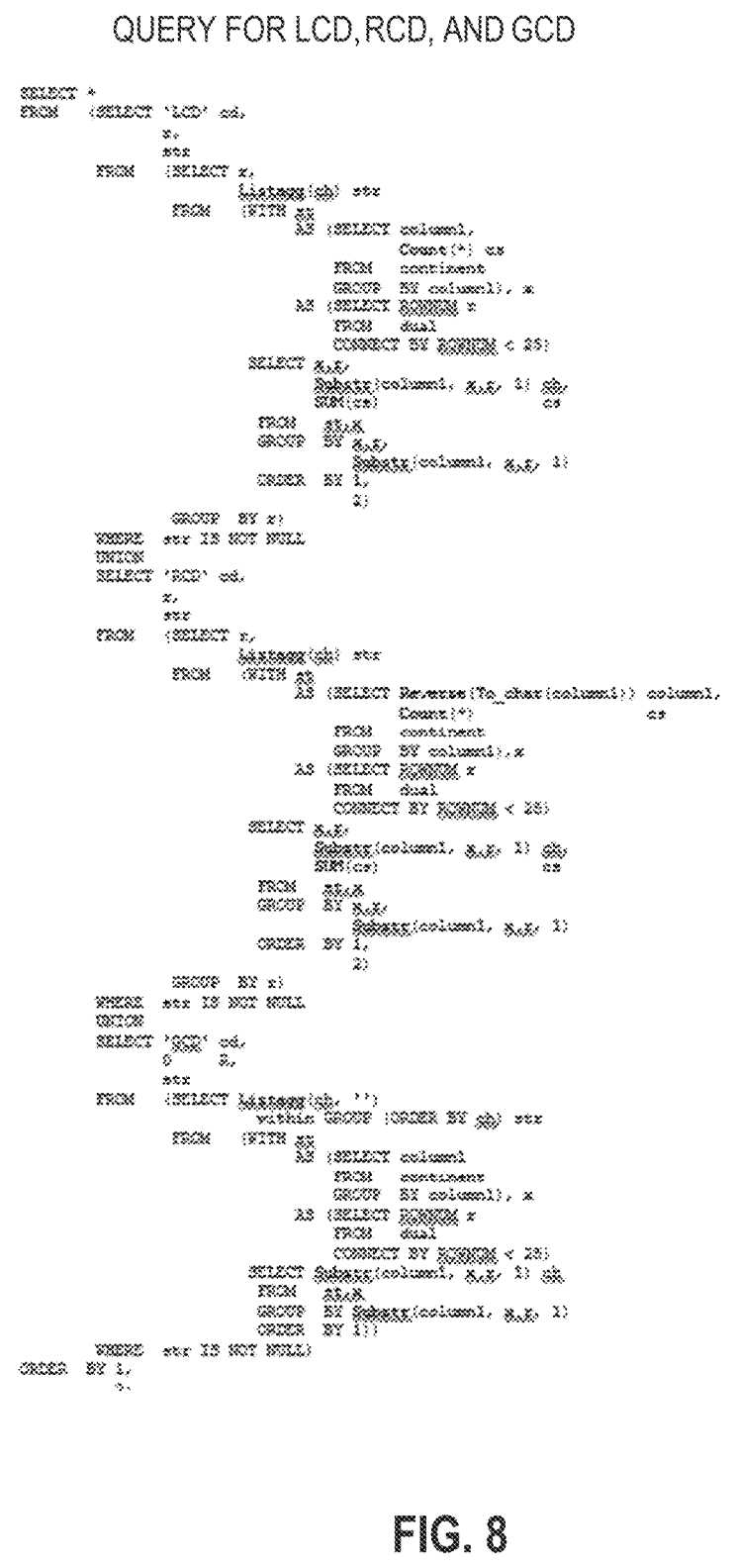

In some implementations, a single query may be used to generate multiple fingerprints. For example, FIG. 8 illustrates a query that generates three fingerprint sets, one for each of the LCD, RCD and GCD fingerprint-generation techniques. Combining the logic of all three fingerprint-generation techniques into a single query allows fingerprints for all three fingerprint-generation techniques to be generated during a single scan over the target column.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   using a first fingerprint-generation technique, generating a first target-column fingerprint set for a target column of a table in a database system based on values contained in the target column;
   performing first comparisons between the first target-column fingerprint set and each of a plurality of first semantic-type fingerprint sets that were generated using the first fingerprint-generation technique, wherein:
   each first semantic-type fingerprint set corresponds to a respective semantic-type of a plurality of semantic-types, and
   each first semantic-type fingerprint set represents a plurality of values of the respective semantic-type;
   based on the first comparisons, generating a plurality of first similarity measures, wherein the plurality of first similarity measures includes a first similarity measure for each semantic-type of the plurality of semantic-types;
   based, at least in part, on the plurality of first similarity measures, determining that the target column contains values that correspond to a particular semantic-type of the plurality of semantic-types; and
   wherein the method is performed by one or more computing devices.

2. The method of claim 1 wherein the plurality of first similarity measures account for both:
   number of characters that match between the first target-column fingerprint set and each first semantic-type fingerprint set, and number of characters that do not match between each first semantic-type fingerprint set the first target-column fingerprint set.

3. The method of claim 1 wherein:
the first fingerprint-generation technique is a per-column fingerprint-generation technique;
the first target-column fingerprint set includes a single target-column fingerprint; and
each of the plurality of first semantic-type fingerprint sets includes a single first semantic-type fingerprint.

4. The method of claim 3 wherein performing first comparisons includes counting how many characters in the single target-column fingerprint are in the single first semantic-type fingerprint of each of the plurality of semantic-types.

5. The method of claim 1 wherein:
the first fingerprint-generation technique is a per-position fingerprint-generation technique;
the first target-column fingerprint set includes one fingerprint for each character position present in values stored in the target column; and
each of the plurality of first semantic-type fingerprint sets includes one fingerprint for each character position present in values associated with the semantic-type.

6. The method of claim 5 wherein performing first comparisons includes, for each semantic-type of the plurality of semantic-types:
for each of a plurality of character positions, determining how many characters in the first target-column fingerprint for the character position are present in first semantic-type fingerprint for the character position.

7. The method of claim 1 further comprising:
using a second fingerprint-generation technique, generating a second target-column fingerprint set for the target column based on values contained in the target column;
performing second comparisons between the second target-column fingerprint set and each of a plurality of second semantic-type fingerprint sets that were generated using the second fingerprint-generation technique, wherein each second semantic-type fingerprint set corresponds to a respective semantic-type of the plurality of semantic-types;
based on the second comparisons, generating a plurality of second similarity measures, wherein the plurality of second similarity measures includes a second similarity measure for each semantic-type of the plurality of semantic-types; and
wherein determining that the target column contains values that correspond to the particular semantic-type is based, at least in part, on both the plurality of first similarity measures and the plurality of second similarity measures.

8. The method of claim 7 further comprising:
for each semantic-type of the plurality of semantic-types, combining a plurality of similarity measures, including the first similarity measure and the second similarity measure, to generate a combined similarity measure for the semantic-type; and
wherein determining that the target column contains values that correspond to the particular semantic-type is performed based, at least in part, on the combined similarity measure for the particular semantic-type.

9. The method of claim 1 further comprising:
before using the first fingerprint-generation technique to generate the first target-column fingerprint set for the target column:

using a second fingerprint-generation technique, generating a second target-column fingerprint set for the target column based on values contained in the target column;
performing second comparisons between the first target-column fingerprint set and each of a plurality of second semantic-type fingerprint sets that were generated using the second fingerprint-generation technique, wherein each second semantic-type fingerprint set corresponds to a respective semantic-type of a plurality of semantic-types;
based on the second comparisons, generating a plurality of second similarity measures, wherein the plurality of second similarity measures includes a second similarity measure for each semantic-type of the plurality of semantic-types;
determining that the plurality of second similarity measures do not satisfy certain criteria; and
wherein using the first fingerprint-generation technique to generate the first target-column fingerprint set is performed responsive to determining that the plurality of second similarity measures do not satisfy the certain criteria.

10. The method of claim 1 wherein generating the plurality of first similarity measures includes generating the plurality of first similarity measures based, at least in part, on:
lengths of one or more fingerprints in the first target-column fingerprint set; and
lengths of one or more fingerprints in each of the first semantic-type fingerprint sets.

11. The method of claim 1 wherein generating the plurality of first similarity measures includes generating the plurality of first similarity measures based, at least in part, on:
a count of characters that are in one or more fingerprints in the first target-column fingerprint set that are also present in a corresponding one or more fingerprints in the first semantic-type fingerprint set of each of the plurality of semantic-types.

12. One or more non-transitory computer-readable media storing instructions which, when executed by one or more processors, cause:
using a first fingerprint-generation technique, generating a first target-column fingerprint set for a target column of a table in a database system based on values contained in the target column;
performing first comparisons between the first target-column fingerprint set and each of a plurality of first semantic-type fingerprint sets that were generated using the first fingerprint-generation technique, wherein:
each first semantic-type fingerprint set corresponds to a respective semantic-type of a plurality of semantic-types, and
each first semantic-type fingerprint set represents a plurality of values of the respective semantic-type;
based on the first comparisons, generating a plurality of first similarity measures, wherein the plurality of first similarity measures includes a first similarity measure for each semantic-type of the plurality of semantic-types;
based, at least in part, on the plurality of first similarity measures, determining that the target column contains values that correspond to a particular semantic-type of the plurality of semantic-types.

13. The one or more non-transitory computer-readable media of claim 12 wherein the plurality of first similarity measures account for both:
  number of characters that match between the first target-column fingerprint set and each first semantic-type fingerprint set, and
  number of characters that do not match between each first semantic-type fingerprint set the first target-column fingerprint set.

14. The one or more non-transitory computer-readable media of claim 12 wherein:
  the first fingerprint-generation technique is a per-column fingerprint-generation technique;
  the first target-column fingerprint set includes a single target-column fingerprint; and
  each of the plurality of first semantic-type fingerprint sets includes a single first semantic-type fingerprint.

15. The one or more non-transitory computer-readable media of claim 14 wherein performing first comparisons includes counting how many characters in the single target-column fingerprint are in the single first semantic-type fingerprint of each of the plurality of semantic-types.

16. The one or more non-transitory computer-readable media of claim 12 wherein:
  the first fingerprint-generation technique is a per-position fingerprint-generation technique;
  the first target-column fingerprint set includes one fingerprint for each character position present in values stored in the target column; and
  each of the plurality of first semantic-type fingerprint sets includes one fingerprint for each character position present in values associated with the semantic-type.

17. The one or more non-transitory computer-readable media of claim 16 wherein performing first comparisons includes, for each semantic-type of the plurality of semantic-types:
  for each of a plurality of character positions, determining how many characters in the first target-column fingerprint for the character position are present in first semantic-type fingerprint for the character position.

18. The one or more non-transitory computer-readable media of claim 12 further comprising instructions which, when executed by the one or more processors, cause:
  using a second fingerprint-generation technique, generating a second target-column fingerprint set for the target column based on values contained in the target column;
  performing second comparisons between the second target-column fingerprint set and each of a plurality of second semantic-type fingerprint sets that were generated using the second fingerprint-generation technique, wherein each second semantic-type fingerprint set corresponds to a respective semantic-type of the plurality of semantic-types;
  based on the second comparisons, generating a plurality of second similarity measures, wherein the plurality of second similarity measures includes a second similarity measure for each semantic-type of the plurality of semantic-types; and
  wherein determining that the target column contains values that correspond to the particular semantic-type is based, at least in part, on both the plurality of first similarity measures and the plurality of second similarity measures.

19. The one or more non-transitory computer-readable media of claim 18 further comprising instructions which, when executed by the one or more processors, cause:
  for each semantic-type of the plurality of semantic-types, combining a plurality of similarity measures, including the first similarity measure and the second similarity measure, to generate a combined similarity measure for the semantic-type; and
  wherein determining that the target column contains values that correspond to the particular semantic-type is performed based, at least in part, on the combined similarity measure for the particular semantic-type.

20. The one or more non-transitory computer-readable media of claim 12 further comprising instructions which, when executed by the one or more processors, cause:
  before using the first fingerprint-generation technique to generate a first target-column fingerprint set for the target column:
    using a second fingerprint-generation technique, generating a second target-column fingerprint set for the target column based on values contained in the target column;
    performing second comparisons between the first target-column fingerprint set and each of a plurality of second semantic-type fingerprint sets that were generated using the second fingerprint-generation technique, wherein each second semantic-type fingerprint set corresponds to a respective semantic-type of a plurality of semantic-types;
    based on the second comparisons, generating a plurality of second similarity measures, wherein the plurality of second similarity measures includes a second similarity measure for each semantic-type of the plurality of semantic-types;
    determining that the plurality of second similarity measures do not satisfy certain criteria; and
  wherein using the first fingerprint-generation technique to generate the first target-column fingerprint set is performed responsive to determining that the plurality of second similarity measures do not satisfy the certain criteria.

21. The one or more non-transitory computer-readable media of claim 12 wherein generating the plurality of first similarity measures includes generating the plurality of first similarity measures based, at least in part, on:
  lengths of one or more fingerprints in the first target-column fingerprint set; and
  lengths of one or more fingerprints in each of the first semantic-type fingerprint sets.

22. The one or more non-transitory computer-readable media of claim 12 wherein generating the plurality of first similarity measures includes generating the plurality of first similarity measures based, at least in part, on:
  a count of characters that are in one or more fingerprints in the first target-column fingerprint set that are also present in a corresponding one or more fingerprints in the first semantic-type fingerprint set of each of the plurality of semantic-types.

* * * * *

UNITED STATES PATENT AND TRADEMARK OFFICE
CERTIFICATE OF CORRECTION

PATENT NO. : 12,174,876 B2
APPLICATION NO. : 17/899799
DATED : December 24, 2024
INVENTOR(S) : Shaked et al.

Page 1 of 1

It is certified that error appears in the above-identified patent and that said Letters Patent is hereby corrected as shown below:

In the Specification

In Column 7, Line 61, delete "(0.05 2*0.67" and insert -- (0.05^2*0.67) --, therefor.

Signed and Sealed this
First Day of April, 2025

Coke Morgan Stewart
*Acting Director of the United States Patent and Trademark Office*